W. HARRISON.
SIPHON.
APPLICATION FILED NOV. 28, 1908.
922,698.
Patented May 25, 1909.
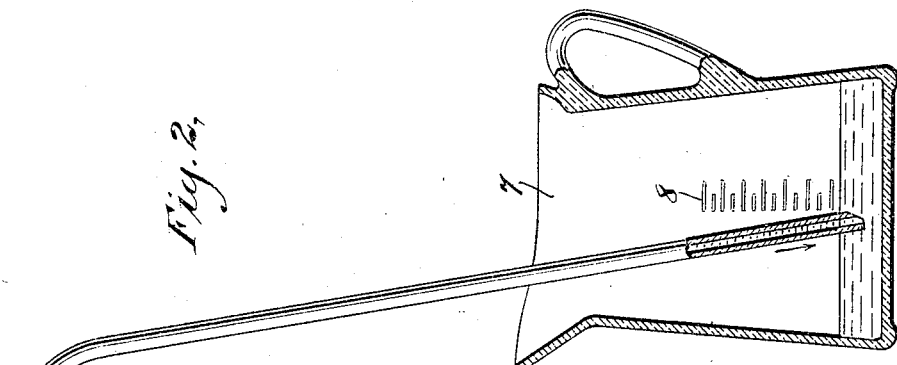
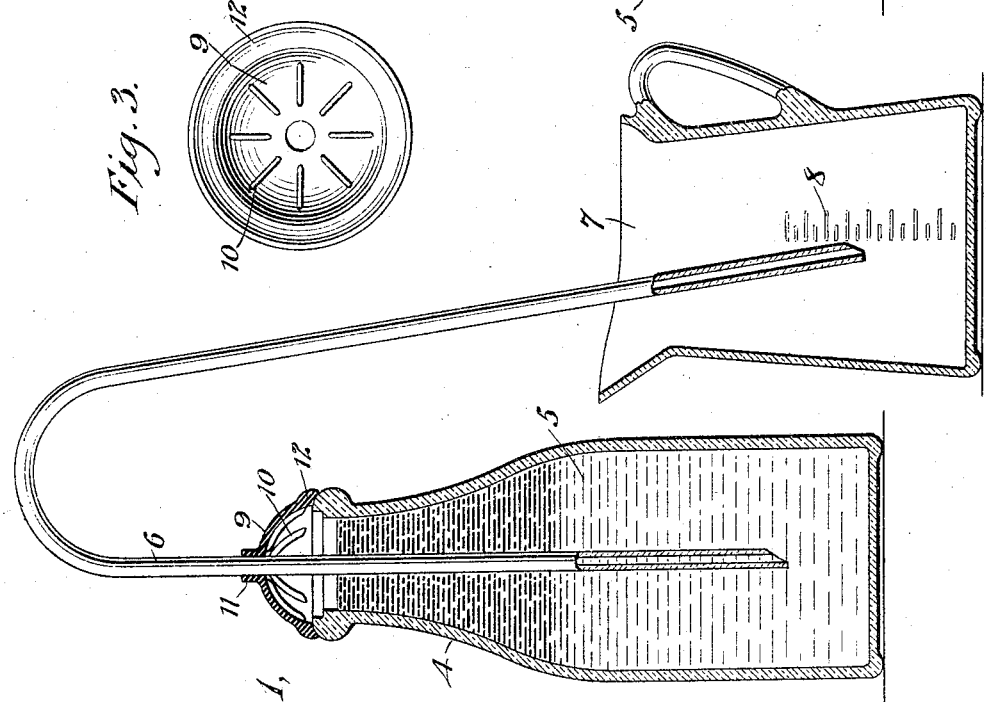
Witnesses:
Edward Thorpe
J. Bernard Waller
Inventor
Walton Harrison

UNITED STATES PATENT OFFICE.

WALTON HARRISON, OF BLOOMFIELD, NEW JERSEY.

SIPHON.

No. 922,698.  Specification of Letters Patent.  Patented May 25, 1909.

Application filed November 28, 1908. Serial No. 464,902.

*To all whom it may concern:*

Be it known that I, WALTON HARRISON, a citizen of the United States, and a resident of Bloomfield, in the county of Essex and State of New Jersey, have invented a new and Improved Siphon, of which the following is a full, clear, and exact description.

My invention relates to siphons and parts associated therewith, my more particular object being to produce a siphon for household use and provided with improved means for starting it into action.

More specifically stated, my invention comprehends a siphon tube to be inserted into a milk bottle or other receptacle, and a dome of resilient material mounted upon the tube and adapted, upon the simple application of a gentle pressure by hand, first to fit air-tight upon the receptacle, next to transmit air pressure momentarily to a liquid contained in the receptacle, and finally to collapse and permit the free ingress of air to the receptacle.

As my invention may have many distinct forms, all embodying the same general principle, I illustrate and describe only one representative form.

Reference is to be had to the accompanying drawings forming a part of this specification, in which similar characters of reference indicate corresponding parts in all the figures.

Figure 1 is a side elevation showing the dome of resilient material mounted upon a siphon tube and applied therewith to an ordinary milk bottle containing milk to be siphoned; this view also showing a beaker for receiving the milk as removed; Fig. 2 shows the relative position of the parts after the siphon is started into action; and Fig. 3 is a detail of the improved dome, considered by itself as an article of manufacture.

The receptacle 4 is an ordinary milk bottle, filled with milk 5, just as delivered from a milk wagon. A siphon tube, preferably of glass, is shown at 6 and a beaker at 7. This beaker is provided with graduations 8 for automatically indicating the number of ounces of milk drawn off by the siphon tube.

At 9 is a dome of resilient material, preferably soft rubber, and provided with ribs 10 of the same material, integral with it. The dome is further provided with a neck 11 which is merely an annular bearing surface. The neck is stretched a little, and slipped over the tube, so as to fit the same air-tight. The dome is provided with a larger annular bearing surface 12, slightly concave, and adapted to fit air-tight upon the milk bottle. The dome has approximately a hemispherical form, being slightly flattened, however, at its top. By virtue of its general shape and the nature of the material of which it is composed, the dome is adapted to turn inside out when a suitable pressure is applied upon its top, and also to automatically retain, for the time being, the new shape which it thus assumes. The dome is so located upon the siphon tube that when the parts are in normal position, as indicated in Fig. 1, the tube is supported entirely by the dome, the lower end of the tube clearing the bottom of the bottle by a distance adequate to permit the dome to be compressed.

The operation of my device is as follows: The parts being in normal position, as indicated in Fig. 1, the operator lays a hand upon the dome and suddenly applies a gentle pressure to the same. There is, of course, a little volume of air within and under the same, and, as the dome is compressed, this volume of air momentarily presses upon the liquid in the bottle, so as to start the siphon into action. The pressure of the hand being continued for a fraction of a second longer, so as to distort the dome considerably, it suddenly collapses, turns inside out, and thus springs into a new but definite shape which it retains automatically until disturbed afterward. In doing this the ribs 10 are expanded or stretched radially outward. If, as may sometimes happen, the dome is not fitted properly or is operated clumsily and therefore fails to spring into the ideal shape indicated in Fig. 2, or, for any reason, fails to properly clear the top of the milk bottle, the ribs 10, or some of them, engage the inner surface of the bottle neck and bear the dome slightly away from the bottle so as to permit free ingress of air thereinto. It will thus be seen that, while the dome 9 is in fact merely a single piece of rubber, and is operated by a single momentary application of pressure upon its top, it performs, in a definite order of succession, several distinct functions. That is to say, it first hugs tightly upon the bottle for a moment so as to form an air-tight joint, next applies an air pressure to the liquid, then gets out of the way so as to open the top of the bottle, and finally expands its ribs as a precaution further insuring an adequate ingress of air.

In order to clean the siphon tube and the dome, the latter is slipped off, both are scalded or otherwise cleaned, and the dome is replaced upon the tube and sprung into its normal position.

Having thus described my invention, I claim as new and desire to secure by Letters Patent:

1. The combination of a siphon tube, and a member of resilient material connected therewith and adapted to fit air-tight upon a receptacle, said member being free to undergo distortion for the purpose of destroying its air-tight fit.

2. As an article of manufacture, a dome of resilient material provided centrally with an annular bearing surface and provided peripherally with another annular bearing surface, said dome being further provided with ribs integral with it and disposed adjacent to said last-mentioned bearing surface.

3. As an article of manufacture, a dome of resilient material provided centrally with an annular bearing surface and provided peripherally with a second annular bearing surface, said dome having such form that it may be sprung into two distinct shapes, and capable of automatically holding either of said shapes.

4. As an article of manufacture, a substantially hemispherical dome of resilient material provided centrally with an annular bearing surface and provided peripherally with a second bearing surface, said dome being capable of distortion for the purpose of shifting the position of one of said bearing surfaces relatively to the other, and having such form as to automatically retain said bearing surfaces in the relative positions into which they are thus shifted.

5. The combination of a tubular member adapted to facilitate the discharge of a liquid, and a compressible dome of resilient material mounted upon said tubular member and adapted to fit air-tight upon a receptacle, said dome being so formed as to assume, when subjected momentarily to extraneous pressure, an abnormal form which it retains until disturbed, for the purpose of admitting air into said receptacle.

6. The combination of a siphon tube, and a member of resilient material fitted air-tight thereupon and adapted to fit air-tight upon a receptacle, said member of resilient material being capable of distortion for the purpose of loosening it relatively to said receptacle in order to permit air to flow into the latter.

7. The combination of a siphon and a compressible member of resilient material mounted thereupon and adapted to fit air-tight upon a receptacle, said compressible member being of proper form to disengage said receptacle, so as to admit air into the latter when pressure is applied to the outside of said member, for the purpose of starting said siphon into action.

8. The combination of a tubular member, and a dome of resilient material mounted thereupon and adapted to fit air-tight upon a receptacle, said dome being distortable into two definite shapes, and being so formed as to automatically retain either of said shapes when distorted thereinto.

In testimony whereof I have signed my name to this specification in the presence of two subscribing witnesses.

WALTON HARRISON.

Witnesses:
L. ALMQUIST,
GEO. W. NAYLOR.